United States Patent [19]

Arremann

[11] 4,358,811

[45] Nov. 9, 1982

[54] D-C REGULATOR CIRCUIT

[75] Inventor: Hans Arremann, Erlangen, Fed. Rep. of Germany

[73] Assignee: Siemens Aktiengesellschaft, Berlin and Munich, Fed. Rep. of Germany

[21] Appl. No.: 239,977

[22] Filed: Mar. 3, 1981

[30] Foreign Application Priority Data

Mar. 7, 1980 [DE] Fed. Rep. of Germany ....... 3008907

[51] Int. Cl.³ .......................... H02H 1/06; H02M 3/32
[52] U.S. Cl. .................................... 361/100; 363/135; 363/138; 363/124; 307/252 M
[58] Field of Search .......................... 361/91, 88, 100; 363/50, 55, 57, 52, 54, 27, 37, 128, 135, 136, 138, 124; 307/252 M

[56] References Cited

U.S. PATENT DOCUMENTS 3,614,586 10/1971 King ................................ 307/252 M
4,259,714 3/1981 Zander ............................ 363/138 X

FOREIGN PATENT DOCUMENTS 2513211 9/1976 Fed. Rep. of Germany ........ 363/37

Primary Examiner—Patrick R. Salce

Attorney, Agent, or Firm—Kenyon & Kenyon

[57] ABSTRACT

A regulator has a main valve connected between a first terminal of a d-c source and a first terminal of a load. A first series circuit poled similarly to the main valve and including a commutating valve in series with a commutating capacitor is connected in parallel with the main valve. Another series circuit including the commutating valve, a reversing valve and a reversing choke is connected in parallel with the main valve and conducts current in the same direction. A swingback valve is connected in parallel with the reversing valve and poled oppositely. A second choke is connected in series with the capacitor in the first series circuit and the end of the second choke connected to the first load terminal is also connected to a second line terminal by a first bypass diode poled to carry the load current, and a second bypass valve is connected between the second load terminal and the end of the second choke connected to the capacitor and is also poled to be conductive to current flowing in the load when the main valve is non-conductive. With the main valve blocked, a very small voltage can thereby be impressed on the load without the occurrence of overvoltages at the capacitor.

2 Claims, 1 Drawing Figure

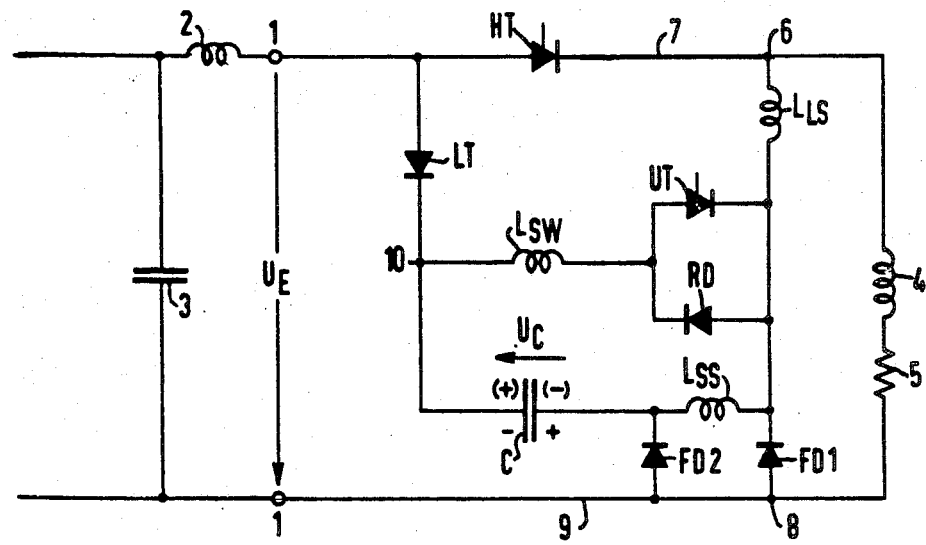

D-C REGULATOR CIRCUIT

BACKGROUND OF THE INVENTION

The invention relates to a d-c regulator circuit of a type related to the d-c regulator circuit shown in German Offenlegungsschrift No. 26 22 351.

With a conventional regulator circuit, the voltage of a given d-c voltage source can be reduced so that the mean value of the output voltage applied across a load can be controlled nearly down to zero. This mean value depends primarily on the duty cycle of the main valve, but due to the necessary reversal of the charge of the commutating capacitor, it is not possible for the duty cycle of the main valve to fall below a certain minimum value. During the quenching process, the voltage of the commutating capacitor is applied to the load in addition to the input voltage. As a result, minimum voltages no less than about 8 to 12% of the d-c input voltage can be obtained in the normal control range, in which the load voltage, i.e., the output voltage of the regulator, is controlled by the duty cycle of the main regulator valve.

In the previously-mentioned German Offenlegungsschrift No. 26 22 351 provision is made to extend the normal control to smaller output voltages. To do so, the main valve remains blocked and, during the reversal time, only a certain portion of the capacitor voltage is applied to the load through appropriate control of the commutating valve, the reversal valve, and the controlled swingback valve ("phase angle control"). As compared to conventional d-c regulator circuits, the circuit in the Offenlegungsschrift is distinguished by the polarity of the reversal valve and the swingback valve.

In the normal control range the circuit includes means so that, during the time between extinguishing and refiring the main valve, the commutating capacitor is held at the polarity it assumed due to the current commutated to the quenching branch during the quenching process. This state of the commutating capacitor is retained also after the main valve has been fired and the charge of the capacitor is reversed by firing the reversal valve only at a time, which is determined by the inductance of the reversing choke and the capacitance of the commutating capacitor, prior to the planned firing of the reversal valve, and the circuit is prepared for the quenching of the main valve. The quenching valve and the swingback valve are fired simultaneously. To reduce the output voltage, the time that the main valve conducts is reduced by shortening the time interval between the triggering of the main valve and the triggering of the reversing valve. This interval may be reduced more and more until both valves are triggered simultaneously.

To reduce the voltage still further, it is possible to use phase angle control, at which time the main valve no longer receives firing pulses. The output voltage is generated by the fact that the commutating valve carries current in the interval between the time the swingback valve is triggered and the time it ceases to conduct. As a result, a superposition of the voltage of the d-c voltage source and the voltage at the commutating capacitor is applied to the load. The lowering of the output voltage is thus accomplished by delaying the firing instant for the commutating valve, which must occur during the conduction period of the swingback valve, and shifting it toward the quenching instant of the swingback valve. As a result, the part of the capacitor voltage to be applied to the load is reduced.

However, it has been found, especially with operation in the phase angle control region, that the capacitor is overcharged considerably beyond the voltage required for quenching the main valve, or thyristor. Since the valves and chokes must be designed for the maximum reversal current and maximum inverse voltage, such overvoltages should be prevented. Therefore, Offenlegungsschrift provides a series circuit connected in parallel with the commutating valve and comprising a charging valve in series with an ohmic resistance, the charging valve being conductive to current of opposite polarity from the commutating valve so that the overcharge is partly returned to the d-c voltage source and is partly converted into heat. In order that, when the main valve is fired, the capacitor is kept from being partly discharged in the normal control range via the recharging branch and the capacitor charge is no longer sufficient for quenching the main valve, a modified pulse sequence is given in German Offenlegungsschrift No. 26 35 953 for the main control range, in which the reversing valve is always fired shortly before the main valve.

One disadvantage of such circuits is that, because of the recharging branch, much material and space are required and, because of the ohmic resistors, the circuits have lower efficiency.

OBJECT AND SUMMARY OF THE INVENTION

It is an object of this invention to provide a d-c regulator in which the range over which the output voltage can be varied is extended beyond the range attainable by control of the duration of the conductive interval of the main valve and in which an overcharge of the commutating capacitor is kept low without using a recharging branch.

Further objects will be apparent from the following description together with the drawing.

As in existing circuits, a common choke can be used as the swingback choke and the reversing choke. The latter is connected in series with a parallel circuit consisting of the reversing valve, conductive to current flowing in one direction, and the swingback valve, conductive to current flowing in the opposite direction. This choke provides an inductance which, with the capacitance of the commutating capacitor, forms a tuned circuit for reversing and swingback into which the swingback valve and the reversing valve, respectively, are inserted. However, according to this invention, this inductance is divided into two parts, one of which is the inductance provided by a further choke arranged in the line connecting the commutating capacitor and one terminal of the load. Two bypass diodes connect the two ends of the latter choke to the line coming from the other load terminal, so that this part of the tuned-circuit inductance is short circuited under operating conditions in which both bypass diodes conduct simultaneously.

The invention and further advantageous embodiments will now be explained in further detail, referring to the drawing, which consists of only one FIGURE illustrating a preferred embodiment of the circuit.

DETAILED DESCRIPTION OF THE PREFERRED EMBODIMENT

In the drawing, the terminals 1 of a d-c voltage source, its inductance 2 and its capacity 3 are shown.

These may be, in particular, a power supply filter inductance and a smoothing capacitor. The load is symbolized by an inductance 4 in series with a resistor 5. The positive output terminal of the filter is connected to a load terminal 6 by a line 7, and the negative filter terminal is connected to the other load terminal 8 by a line 9. The anode-cathode circuit of a thyristor HT, which is the controlled main valve of the d-c regulator circuit, is connected in series with the line 7, and the anode and cathode, which are two terminals of the main valve HT, are connected to each other by a quenching branch. The quenching branch includes a thyristor LT, which is a controlled commutating valve, and is connected in parallel with the main valve. The thyristor LT also serves as the quenching valve in the normal control range and is followed on the load side by a commutating capacitor C. The anode of the commutating valve LT and the anode of the main valve HT are both connected to the positive output terminal 1 of the d-c filter. The cathode of the commutating valve LT is connected to the cathode of the main valve and to the load input 6 by a series circuit that includes the commutating capacitor C. Parallel to the commutating capacitor is a reversing branch which includes the anode-cathode circuit of a thyristor UT and a reversing choke. The thyristor UT is the controlled reversing valve. This reversing branch is in series with the commutating valve LT, i.e., it goes from the junction point 10, between the cathode of the quenching valve LT and the capacitor, to the load input 6. The reversing valve UT is poled to conduct current in the same direction as the commutating valve LT. A swingback, or flyback, branch, which contains a swingback valve RD is connected in parallel with the commutating valve UT but is poled oppositely to the forward direction of the commutating valve, and the parallel-connected valves UT and RD are connected in series with a swingback choke $L_{SW}$ between the points 6 and 10. The swingback valve may be a thyristor, but in this embodiment it is a damping diode. It is advantageous to use a common choke $L_{SW}$ to serve as both the swingback choke and the reversing choke.

A first bypass valve in the form of a diode FD1 is connected in another series circuit, which is in parallel with the load impedance 4 and 5. The arrangement of these components corresponds to known circuits, but a recharging branch normally used in the known circuits is dispensed with. A protective inductance $L_{LS}$ for the valves HT and FD1 can be connected in the series circuit that includes the valve FD1, if the filter inductance 2 is not sufficient for this purpose. It should be noted that this protective inductance is situated outside a current path formed by the inductance 2, the thyristor LT, the capacitor 2, a second bypass valve diode FD2, and the line 9.

According to the invention, a further choke $L_{SS}$ is connected in series, within the part of the quenching branch parallel to the swingback circuit, between the commutating capacitor C and the load terminal 6. A second bypass valve FD2 connects the line 9 to the terminal of the commutating capacitor C on the load side. This second bypass valve FD2 is poled, like the first bypass valve FD1, to be conductive when the line 9 is positive with respect to the ends of the choke $L_{SS}$. If both valves FD1 and FD2 conduct simultaneously, they short-circuit the choke $L_{SS}$.

The operation of the circuit will be described first with the condition for the phase angle control range, in which the main valve HT remains cut off, and the valve FD2 is considered not to exist, as in the known circuits.

With the commutating valve LT non-conductive, the bypass valve FD1 carries the entire load current and the voltage $U_C$ across the commutating capacitor C is assumed to be polarized negatively, as indicated in parentheses. By firing of the reversing valve UT, the capacitor charge is reversed, and subsequently the damping diode RD goes into conduction and the capacitor charge swings back again. The chokes $L_{SS}$ and $L_{SW}$ and the capacitor C form a resonant circuit in which the resonating inductance is $L_S = L_{SW} + L_{SS}$. During the reversal, the energy originally stored by the capacitor C is transferred to the inductance, from which it is returned to the capacitor during the swingback. In the ideal case, where the resonant circuit contains no attenuation due to ohmic losses, the voltage $U_C$ returns to its original value after a sinusoidal oscillation. If the commutating valve LT is fired during this oscillation, the voltage across the resonant circuit is added to the voltage of the voltage source until the bypass valve FD1 becomes non-conductive and, for a short time, the current through the commutating capacitor C increases. After the end of the swingback, the capacitor is therefore charged to a higher voltage than it was prior to the start of the reversal. The capacitor voltage therefore increases with each firing pulse and in the final analysis is limited only by the ohmic resistances of the circuit. These, however, are to be kept small in the interest of high efficiency.

According to this invention, energy is to be removed from the resonant circuit during the reversal and swingback so as to compensate for the energy which flows in during the subsequent firing of the commutating valve LT. This is achieved by splitting the resonant-circuit inductance into the two choke sections $L_{SW}$ and $L_{SS}$, so that the choke $L_{SS}$ can be short-circuited by the two bypass valves FD1 and FD2.

The cathode of the diode FD2 becomes more negative than the cathode of the diode FD1 by the firing of the reversing valve UT, which causes the diode FD1 to become non-conductive and the diode FD2 to take over conduction of the load current. Upon the next zero crossing of the capacitor voltage, the current commutates from the diode FD2 to the diode FD1. This commutation proceeds relatively slowly, so that the inductance $L_{SS}$ is short-circuited for a time and the resonant-circuit inductance is formed by the inductance $L_{SW}$ alone. As a result, the capacitor voltage rises more slowly, which corresponds to a decrease of the energy in the resonant circuit. This energy reduction is caused by the fact that the energy to be removed is stored outside the resonant circuit, namely, in the inductance $L_{SS}$, without ohmis losses occurring in the process. By optimizing the dimensions of the choke inductance $L_{SS}$, it is possible to cause just as much energy to be removed from the resonant circuit as is fed in after the commutating valve has been fired. A minimum capacitor overcharge $U_C = I_A L_E / C$ is then obtained, where $I_A$ is the load current. In a first laboratory system, this overcharge amounted to only 10% of the d-c input voltage, while it was 60% in an identical system without a second bypass diode FD2. The quenching voltage peak in the output voltage was also reduced by 50% in the laboratory system. Most valves are furthermore subjected to less voltage stress because of the division of voltage between the chokes $L_{SW}$ and $L_{SS}$. As a result, it is possible to not only dispense with a recharging branch, but the remaining components can also be designed for lower maximum voltage stress.

The optimum division of the resonant-circuit inductance into the inductances $L_{SS}$ and $L_{SW}$ follows from an analysis of the resonant circuit. For the resonant circuit, the resonant-circuit damping can be expressed by the parameter h, which represents the ratio of the capacitor voltage $\hat{U}$ prior to the firing of the swingback valve to the capacitor voltage $U_{180°}$ after half the period. A quarter-period after the firing of the reversing valve, the maximum reversing current $\hat{I}$ occurs. With the quantities:

$$g=\hat{I}/I_a, \ K_1=g+h^4(g-0.5), \text{ and } K_2=g^2-h^4(g-1)^2$$

the optimum division of the resonant-circuit inductance over the chokes $L_{SS}$ and $L_{SW}$ is obtained as:

$$L_{SW}/(L_{SW}+L_{SS})=K_1-K_1^2-K_2.$$

Adhering to this design is found not to be critical, so that deviations of 20% and more are possible.

What is claimed is:

1. In a d-c regulator circuit for supplying power from a power supply to a load, said regulator having first and second supply terminals for connecting to the power supply and first and second load terminals for connecting to the load, a line coupling the second load terminal to the second supply terminal, comprising:
   a controlled main valve coupling the first supply terminal and the first load terminal;
   a quenching branch coupled between said first supply terminal and first load terminal in parallel with said main valve and including a controlled commutating valve poled to conduct current in the same direction as said controlled main valve, and a commutating capacitor in series with the commutating valve having a lead coupled to said first load terminal;
   a reversing branch coupled in series with said commutating valve and in parallel with said commutating cpacitor and including a controlled reversing valve poled in the forward direction of said commutating valve, and a reversing choke in series with said reversing valve;
   a swingbck branch also coupled in series with said commutating valve and in parallel with said commutating capacitor and including a swingback valve poled in opposition to the forward direction of the commutating valve, and a swingback choke in series therewith; and
   a first bypass valve coupled across said first and second terminals for conducting load current when the main valve is nonconductive, the improvement comprising;
   a further choke coupled in series between said commutating capacitor and said first load terminal and within the part of the quenching branch which is parallel to the swingback branch; and
   a second bypass valve coupling the line which couples the second supply terminal to the second load terminal to the terminal of the commutating capacitor coupled to said first load terminal, said second bypass valve being poled parallel to said first bypass valve.

2. The improvement according to claim 1, wherein said reversing choke and swingback choke comprise a common choke, the fraction of the inductance $L_{SW}$ of the common choke to the sum of the inductance $L_{SS}$ of the further choke and the inductance of the common choke is approximately $$L_{SW}/(L_{SS}+L_{SW})=K_1-K_1^2-K_2,$$

where $g=I/I_a$, $K_1=g+h^4(g-0.5)$, $K_2=g^2-h^4(g-1)^2$ and $I_a$ is the load current, I the reversing current of the resonant circuit comprising the commutating capacitor, common choke and futher choke at the one-quarter period after the firing of the reversing valve, and h, the damping of the resonant circuit, is the ratio of the cpacitor voltage of the resonant circuit before the reversing circuit has been fired and half a period thereafter.

* * * * *